United States Patent
Hessler et al.

(10) Patent No.: US 11,084,000 B2
(45) Date of Patent: Aug. 10, 2021

(54) METHOD OF MAKING CARBON MOLECULAR SIEVE MEMBRANES

(71) Applicants: Dow Global Technologies LLC, Midland, MI (US); Georgia Tech Research Corporation, Atlanta, GA (US)

(72) Inventors: John Hessler, Ellsworth, ME (US); William J. Koros, Atlanta, GA (US); Liren Xu, Pearland, TX (US); Mark K. Brayden, Baton Rouge, LA (US); Marcos V. Martinez, Rosharon, TX (US)

(73) Assignees: Dow Global Technologies LLC, Midland, MI (US); Georgia Tech Research Corporation, Atlanta, GA (US)

(*) Notice: Subject to any disclaimer, the term of this patent is extended or adjusted under 35 U.S.C. 154(b) by 280 days.

(21) Appl. No.: 16/086,621

(22) PCT Filed: Mar. 2, 2017

(86) PCT No.: PCT/US2017/020432
§ 371 (c)(1),
(2) Date: Sep. 20, 2018

(87) PCT Pub. No.: WO2017/165098
PCT Pub. Date: Sep. 28, 2017

(65) Prior Publication Data
US 2019/0099722 A1    Apr. 4, 2019

Related U.S. Application Data

(60) Provisional application No. 62/310,836, filed on Mar. 21, 2016.

(51) Int. Cl.
*B01D 67/00* (2006.01)
*B01D 53/22* (2006.01)
(Continued)

(52) U.S. Cl.
CPC ....... *B01D 67/0067* (2013.01); *B01D 53/228* (2013.01); *B01D 67/0002* (2013.01);
(Continued)

(58) Field of Classification Search
CPC ............ B01D 67/0067; B01D 67/0081; B01D 67/0083; B01D 71/021; B01D 71/64; B01D 53/22; B01D 53/228
See application file for complete search history.

(56) References Cited

U.S. PATENT DOCUMENTS

| 5,288,304 A | 2/1994 | Koros et al. |
| 6,565,631 B2 | 5/2003 | Koros et al. |

(Continued)

FOREIGN PATENT DOCUMENTS

| EP | 459623 B1 | 6/1994 |
| WO | 2017105836 A1 | 6/2017 |

OTHER PUBLICATIONS

Steel, K. M.; et. al.; "An investigation of the effects of pyrolysis parameters on gas separation properties of carbon materials," Carbon, 2005, p. 1843-1856, v. 43, Elsevier.
(Continued)

*Primary Examiner* — Renee Robinson
(74) *Attorney, Agent, or Firm* — Dinsmore & Shohl LLP

(57) ABSTRACT

The invention is an improved method of making a carbon molecular sieve (CMS) membrane in which a polyimide precursor polymer is pyrolyzed to form a carbon molecular sieve membrane by heating, in a furnace, said polyimide precursor polymer to a final pyrolysis temperature of 600 C to 700 C at a pyrolysis heating rate of 3 to 7 C/minute from
(Continued)

400 C to the final pyrolysis temperature, the final pyrolysis temperature being held for a pyrolysis time of at most 60 minutes in a non-oxidizing atmosphere. In a particular embodiment, the cooling rate from the pyrolysis temperature is accelerated by methods to remove heat. The CMS membranes have shown an improved combination of selectivity and permeance as well as being particularly suitable to separate gases in gas streams such methane from natural gas, oxygen from air and ethylene or propylene from light hydrocarbon streams.

17 Claims, 1 Drawing Sheet

(51) Int. Cl.
    *B01D 69/08*     (2006.01)
    *B01D 71/02*     (2006.01)
    *B01D 71/64*     (2006.01)
(52) U.S. Cl.
    CPC ..... *B01D 67/0081* (2013.01); *B01D 67/0083* (2013.01); *B01D 69/08* (2013.01); *B01D 71/021* (2013.01); *B01D 71/64* (2013.01); *B01D 2256/10* (2013.01); *B01D 2256/12* (2013.01); *B01D 2256/22* (2013.01); *B01D 2256/245* (2013.01); *B01D 2323/08* (2013.01); *B01D 2323/50* (2013.01); *B01D 2325/20* (2013.01); *B01D 2325/28* (2013.01); *Y02C 20/20* (2013.01)

(56) References Cited

U.S. PATENT DOCUMENTS

| | | | |
|---|---|---|---|
| 8,486,179 | B2 | 7/2013 | Kiyono et al. |
| 8,911,534 | B2 | 12/2014 | Koros et al. |
| 2009/0270665 | A1* | 10/2009 | Magalhaes Mendes ..................... B01D 71/028 585/259 |
| 2013/0333562 | A1 | 12/2013 | Koros et al. |
| 2015/0182921 | A1* | 7/2015 | Koros ................... B01D 71/021 96/4 |
| 2015/0290596 | A1 | 10/2015 | Koros et al. |

OTHER PUBLICATIONS

Xiaoli, Ma, et. al., "Ultrathin carbon molecular sieve membrane for propylene/propane separation," AlChE Journal, 2015, p. 491-499, v. 62, No. 2.

Xiaoli, Ma, et. al., "Gamma-Alumina Supported Carbon Molecular Sieve Membrane for Propylene/Propane Separation," Industrial & Engineering Chemistry Research, 2013, p. 4297-4305, v. 52, No. 11.
Favvas, E. P. et. al., "A methodology for the morphological and physiocochernical characterisation of asymmetric carbon hollow fiber membranes," Journal of Membrane Science, 2011, p. 113-123, v. 375, No. 1, Elsevier.
Favvas, E. P. et. al., "Characterization of highly selective rnicroporous carbon hollow fiber membranes prepared from a commercial co-polyimide precursor," Journal of Porous Materials, 2007, p. 625-627, 631-633, v. 15, No. 6, Kluwer Academic Publishers.
Favvas, E. P. et. al., "Helium and hydrogen selective carbon hollow fiber membranes: The effect of pyrolysis isothermal time," Separation and Purification Technology, 2015, p. 176-181, v. 142.
Su, et. al., "Effects of carbonisation atmosphere on the structural characteristics and transport properties of carbon membranes prepared from Kapton® polyimide," Journal of Membrane Science, 2007, p. 263-270, v. 305, No. 1-2, Elsevier.
Barsema, J. N., et. al., "Intermediate polymer to carbon gas separation membranes based on Matrimid PI," Journal of Membrane Science, 2004, p. 93-102, v. 238, No. 1-2.
Steel, K. M., et. al., Investigation of Porosity of Carbon Materials and Related Effects on Gas Separation Properties, Carbon, 2003, p. 253-266, v. 41.
Suda, H., et. al., "Gas Permeation Through Micropores of Carbon Molecular Sieve Membranes Derived From Kapton Polyimide," J. Phys. Chem. B, 1997, p. 3988-3994, v. 101.
Xu, Liren, et. al., "Olefins-selective asymmetric carbon molecular sieve hollow fiber membranes for hybrid membrane-distillation processes for olefiniparaffin separations," Journal of Membrane Science, 2012, p. 314-323, v. 423-424.
Xu, Liren, et. al., "Matrirnid® derived carbon molecular sieve hollow fiber membranes for ethylene/ethane separation," Journal of Membrane Science, 2011, p. 138-147, v. 380.
Rungta, Meha, et. al., "Carbon molecular sieve dense film membranes derived from Matrimid for ethylene/ethane separation," Carbon, 2012, p. 1488-1502, v. 50.
Rungta, Meha, et. al., "Membrane-Based Ethylene/Ethane Separation: The Upper Bound and Beyond," AlChE Journal, 2013, p. 3475-3496, v. 9.
Geiszler, V. C., et. al., "Effects of Polyimide Pyrolysis Conditions on Carbon Molecular Sieve Membrane Properties," American Chemical Society, 1996, p. 2999-3003, v. 35, No. 9.
Koresh, J. E., et. al., "Molecular sieve permselevtive membrane. Part 1. Presentation of a new device for gas mixture separation," Separation Science and Technology, 1983, p. 723-734, v. 18, No. 9.
Office Action pertaining to corresponding European Patent Application No. 17712883.2, dated Sep. 27, 2019.

\* cited by examiner

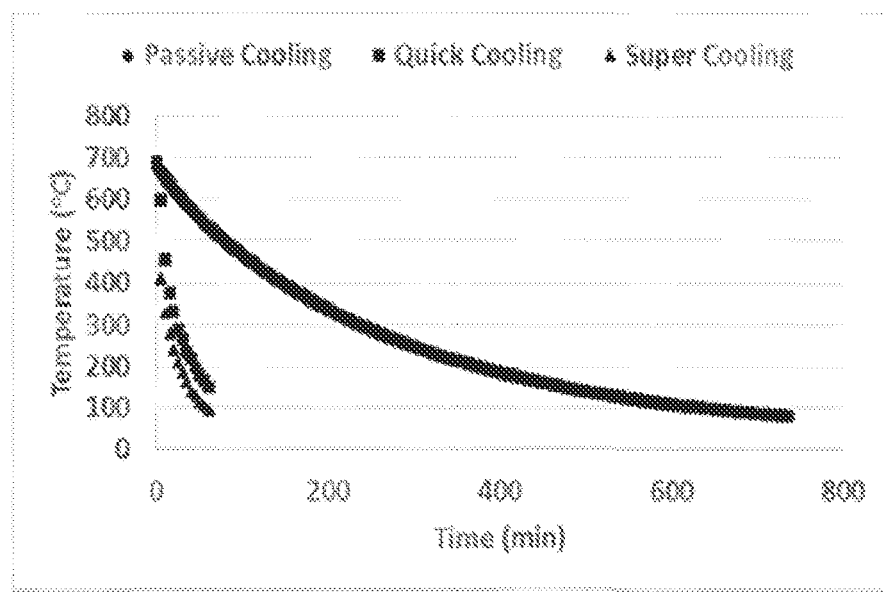

METHOD OF MAKING CARBON MOLECULAR SIEVE MEMBRANES

FIELD OF THE INVENTION

The invention relates to carbon molecular sieve (CMS) membranes for use in gas separation. In particular the invention relates to a method for producing CMS membranes with improved selectivity, permeability and stability.

BACKGROUND OF THE INVENTION

Membranes are widely used for the separation of gases and liquids, including for example, separating acid gases, such as $CO_2$ and $H_2S$ from natural gas, and the removal of $O_2$ from air. Gas transport through such membranes is commonly modeled by the sorption-diffusion mechanism. Currently, polymeric membranes are well studied and widely available for gaseous separations due to easy process-ability and low cost. CMS membranes, however, have been shown to have attractive separation performance properties exceeding that of polymeric membranes.

CMS membranes are typically produced through thermal pyrolysis of polymer precursors. For example, it is known that defect-free hollow fiber CMS membranes can be produced by pyrolyzing cellulose hollow fibers (J. E. Koresh and A. Soffer, Molecular sieve permselective membrane. Part I. Presentation of a new device for gas mixture separation. Separation Science and Technology, 18, 8 (1983)). In addition, many other polymers have been used to produce CMS membranes in fiber and dense film form, among which polyimides have been favored. Polyimides have a high glass transition temperature, are easy to process, and have one of the highest separation performance properties among other polymeric membranes, even prior to pyrolysis.

Polyimide hollow fibers have been pyrolyzed to form CMS membranes under vacuum such as described by U.S. Pat. No. 6,565,631. U.S. Pat. No. 6,565,631 also discloses a method of using CMS membranes to separate $CO_2$ from a methane stream containing 10% $CO_2$, at 1000 psia and 50° C., with a selectivity of approximately 45, a selectivity that is much higher than typical commercial polymeric membranes. Other patents that describe processes for producing carbon membranes (both asymmetric hollow "filamentary" and flat sheets), and applications for gas separation, include U.S. Pat. No. 5,288,304, and EP Patent No. 0459623.

Prior research has shown that CMS membrane separation properties are primarily affected by the following factors: (1) pyrolysis precursor, (2) pyrolysis temperature, (3) thermal soak time, and (4) pyrolysis atmosphere. For example, Steel and Koros performed a detailed investigation of the impact of pyrolysis temperature, thermal soak time, and polymer composition on the performance of carbon membranes. (K. M. Steel and W. J. Koros, Investigation of Porosity of Carbon Materials and Related Effects on Gas Separation Properties, Carbon, 41, 253 (2003).) Membranes were produced in an air atmosphere at 0.05 mm Hg pressure. The results showed that increases in both temperature and thermal soak time increased the selectivity but decreased permeability for $CO_2/CH_4$ separation. In addition, Steel et al showed that a precursor polymer with a tightly packed structure tends to lead to a CMS membrane having higher selectivity compared with less compact precursor polymers.

The impact of pyrolysis atmosphere has been researched only to a limited extent. Suda and Haraya disclosed the formation of CMS membranes under different environments. (H. Suda and K. Haraya, Gas Permeation Through Micropores of Carbon Molecular Sieve Membranes Derived From Kapton Polyimide, J. Phys. Chem. B, 101, 3988 (1997).) CMS dense films were prepared from polyimide Kapton® at 1000° C. in either argon or in vacuum. According to their gas separation properties, the results of an $O_2/N_2$ separation were almost the same between 6 membranes formed under the different atmospheres. Suda and Haraya did not disclose the effects of atmosphere on $CO_2$ separation from natural gas, nor disclose how separation properties vary with ability and low cost. Similarly, Geiszler and Koros disclosed the results of CMS fibers produced from pyrolysis of fluorinated polyimide in helium and argon for both $O_2/N_2$ and $H_2/N_2$ separations. (V. C. GEISZLER and W. J. Koros, "Effects of Polyimide Pyrolysis Conditions on Carbon Molecular Sieve Membrane Properties," American Chemical Society, 1996, v. 35, no. 9, pp. 2999-3003). That paper disclosed a slightly higher selectivity with vacuum pyrolysis than the purged pyrolysis processes. In addition, Geiszler and Koros showed that the flow rate of the purge gases impacted performance. In U.S. Pat. No. 8,486,179, the effect of using atmospheres having small amounts of oxygen in the pyrolysis atmosphere was described.

It would be desirable to provide an improved method to make a CMS membrane and CMS membrane made by the method that addresses one or more of the problems of the prior art such as one described above. For example, it would be desirable to provide a CMS membrane that has an improved combination of selectivity and permeance (or permeability) for particular permeate gas molecule/retentate gas molecules.

SUMMARY OF THE INVENTION

A first aspect of the invention method of making a carbon molecular sieve membrane comprising,
(i) providing a polyimide precursor polymer;
(ii) heating, in a furnace, said polyimide precursor polymer to a final pyrolysis temperature of 600° C. to 700° C. at a pyrolysis heating rate of 3 to 7° C./minute from 400° C. to the final pyrolysis temperature, the final pyrolysis temperature being held for a pyrolysis time of at most 60 minutes in a non-oxidizing atmosphere;
(iii) cooling the carbon molecular sieve membrane to room temperature.

The method of the invention may realize a CMS that has an improved combination of selectivity and permeance. Illustratively, the method allows for CMS membrane having good selectivity for similar sized gas molecules (e.g., ethylene/ethane and propylene/propane) while still having higher permeance of the target permeate gas molecule (e.g., ethylene or propylene)

A second aspect of the invention is carbon molecular sieve made by the process of the first aspect.

A third aspect of the invention is a process for separating a gas molecule from a feed gas comprised of the gas molecule and at least one other gas molecule comprising
(i) providing the carbon molecular sieve membrane of the first aspect; and
(ii) flowing the gas feed through said carbon molecular sieve membrane to produce a first stream having an increased concentration of the gas molecule and a second stream having an increased concentration of the other gas molecule.

A fourth aspect of the invention is carbon molecular sieve module comprising a sealable enclosure comprised of: a plurality of carbon molecular sieve membranes, comprising at least one carbon molecular sieve membrane of any one of claims 1 to 9, contained within the sealable enclosure; an inlet for introducing a gas feed comprised of at least two differing gas molecules; a first outlet for permitting egress of a permeate gas stream; and a second outlet for egress of a retentate gas stream.

A fifth aspect of the invention is a method of making a carbon molecular sieve membrane comprising,
(i) providing a polyimide precursor polymer;
(ii) heating, in a furnace, said polyimide precursor polymer to a final pyrolysis temperature of 500° C. to 1500° C. at a pyrolysis heating rate of 0.01 to 200° C./minute to the final pyrolysis temperature, the final pyrolysis temperature being held for a pyrolysis time of several seconds to several days in a non-oxidizing atmosphere;
(iii) cooling the carbon molecular sieve membrane to room temperature at an accelerated cooling rate.

It has been surprisingly found that improved permeance/selectivity may be realized even at widely varying pyrolysis conditions.

The gas separation method is particularly useful for separating gas molecules in gas feeds that have very similar molecular sizes such as ethane/ethylene and propane/propylene. It may also be used to separate gases from atmospheric air such as oxygen or separating gases (e.g., methane) in natural gas feeds.

DESCRIPTION OF FIGURES

The FIGURE is a view is a graph of exemplary accelerated cooling of the invention and passive cooling.

DETAILED DESCRIPTION OF THE INVENTION

The polyimide precursor polymer may be any useful polyimide polymer for making CMS membranes. The polyimide may be a conventional or fluorinated polyimide. Desirable polyimides typically contain at least two different moieties selected from 2,4,6-trimethyl-1,3-phenylene diamine (DAM), oxydianaline (ODA), dimethyl-3,7-diaminodiphenyl-thiophene-5,5'-dioxide (DDBT), 3,5-diaminobenzoic acid (DABA), 2,3,5,6-tetramethyl-1,4-phenylene diamine (durene), meta-phenylenediamine (m-PDA), 2,4-diaminotoluene (2,4-DAT), tetramethylmethylenedianaline (TMMDA), 4,4'-diamino 2,2'-biphenyl disulfonic acid (BDSA); 5,5'-[2,2,2-trifluoro-1-(trifluoromethyl)ethylidene]-1,3-isobenzofurandion (6FDA), 3,3',4,4'-biphenyl tetracarboxylic dianhydride (BPDA), pyromellitic dianhydride (PMDA), 1,4,5,8-naphthalene tetracarboxylic dianhydride (NTDA), and benzophenone tetracarboxylic dianhydride (BTDA), with two or more of 6FDA, BPDA and DAM being preferred.

A particularly useful polyimide, designated as 6FDA/BPDA-DAM, may be synthesized via thermal or chemical processes from a combination of three monomers: DAM; 6FDA, and BPDA, each commercially available for example from Sigma-Aldrich Corporation. Formula 1 below shows a representative structure for 6FDA/BPDA-DAM, with a potential for adjusting the ratio between X and Y to tune polymer properties. As used in examples below, a 1:1 ratio of component X and component Y may also abbreviated as 6FDA/BPDA(1:1)-DAM.

Formula 1

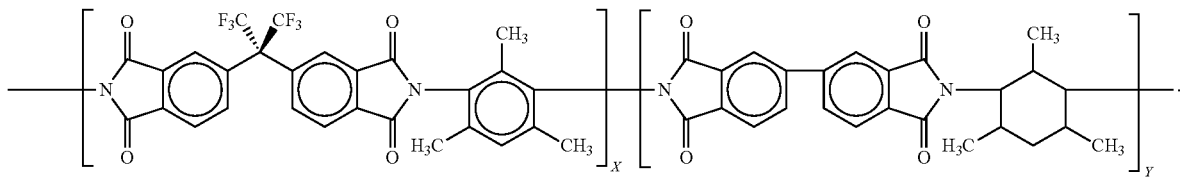

Chemical structure of 6FDA/BPDA-DAM

A second particularly useful polyimide, designated as 6FDA-DAM lacks BPDA such that Y equals zero in Formula 1 above. Formula 2 below shows a representative structure for this polyimide.

Formula 2

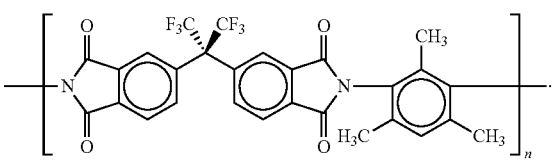

Chemical structure of 6FDA-DAM

A third useful polyimide is MATRIMID™ 5218 (Huntsman Advanced Materials), a commercially available polyimide that is a copolymer of 3,3',4,4'-benzo-phenonetetracarboxylic acid dianhydride and 5(6)-amino-1-(4'-aminophenyl)-1,3,3-trimethylindane (BTDA-DAPI).

Preferred polyimide polymeric precursor hollow fiber membranes, the hollow fibers as produced but not pyrolyzed, are substantially defect-free. "Defect-free" means that selectivity of a gas pair, typically oxygen ($O_2$) and nitrogen ($N_2$), through a hollow fiber membrane is at least 90 percent of the selectivity for the same gas pair through a dense film prepared from the same composition as that used to make the polymeric precursor hollow fiber membrane. By way of illustration, a 6FDA/BPDA(1:1)-DAM polymer has an intrinsic $O_2/N_2$ selectivity (also known as "dense film selectivity") of 4.1.

The precursor polyimide polymers are typically formed into hollow fibers or films. Conventional procedures to make these may be used. For example, coextrusion procedures including such as a dry-jet wet spinning process (in which an air gap exists between the tip of the spinneret and the coagulation or quench bath) or a wet spinning process (with zero air-gap distance) may be used to make the hollow fibers.

It has been discovered that particular heating rates, final pyrolysis temperatures, cooling rates and combinations of them may create CMS membranes having an improved combination of permeance and selectivity of gas molecules of interest in separations as described herein. The heating rate from the temperature where the polyimide precursor begins to form carbon (~400° C.) to the final pyrolysis temperature has been found to be particularly important in the absence of accelerated cooling. Without being limiting in any way, it is believed that if the heating rate is too fast the polymer chains may undergo greater fracturing and thus pack too tightly, causing the permeance to be insufficient and if the rate is too slow the fracturing may be too low, and the selectivity too insufficient. The heating rate from 400° C. to the final pyrolysis temperature is from 3° C. to 7° C./minute. The heating rate may also be the same rate from room temperature. The heating rate from 400° C. to the final pyrolysis temperature desirably is held at one heating rate such as 4° C./minute. It may also be desirable to hold the same heating rate from room temperature (~20° C. to 30° C.) to the final pyrolysis temperature.

The final pyrolysis temperature is desirably from 600° C. to 700° C. or 675° C. in the absence of accelerated cooling. The amount of time at the final pyrolysis temperature is desirably from as short time practicable in view of the heating rate (e.g., several seconds or one minute) to about 60 minutes. In an embodiment, the hold time at the final pyrolysis temperature is from 15 minutes to 60 minutes. Longer times tend not to be necessary and may negatively affect the desired combination of permeance and selectivity.

It is surprising in that the separation performance may be improved over widely varying pyrolysis conditions such as final pyrolysis temperatures from 500° C. to 1500° C. or from at least 550° C. or 600° C. to at most 1000° C., 900° C. or 800° C., heating rates from 0.01° C./min to 200° C./min or from 0.1° C./min or 1° C./min to 100° C./min, 50° C./min or 20° C./min and hold times from several seconds to several days, 24 hours, 8 hours, 2 hours or 1 hour. Accelerating the cooling rate means herein that the cooling rate is accelerated from the heating rate merely occurring from shutting down the power to the furnace with a static atmosphere inside and around the outside of the furnace. Exemplary heat removal methods include: removing insulation (e.g., removing the insulating box around a tube in a tube furnace); flowing a gas directly over the carbon molecular sieve membrane within the furnace; flowing a gas through the carbon molecular sieve membrane within the furnace; flowing a liquid over at least a portion of the furnace or flowing a gas over at least a portion of the furnace. Any one or combination of heat removal methods may be used, with it being desirable to have the cooling rate as high as possible at least from the final pyrolysis temperature to about 400° C. or to room temperature (~20 to 30° C.). Generally, the average cooling rate from the final pyrolysis temperature to 400° C. is greater than about 2, 4 or even 6° C./minute. The average heating rate is the temperature difference between the final pyrolysis temperature and 400° C. and the total time it takes to reach 400° C. The cooling rate from 400° C. to room temperature may be any practicable with faster being desirable merely for productivity sake.

It is understood that all temperatures, heating rates and cooling rates are those as measured in the furnace and not the actual CMS membranes being formed. The actual temperature of the CMS membranes being formed may vary somewhat due to temperature lag due to thermal mass within the furnace, particular furnace used and the like and is readily determinable by one skilled in the art.

Any suitable supporting means for holding the CMS membranes may be used during the pyrolysis including sandwiching between two metallic wire meshes or using a stainless steel mesh plate in combination with stainless steel wires and as described by U.S. Pat. No. 8,709,133 at col. 6 line 58 to col. 7, line 4, which is incorporated by reference.

Precursor polyimide polymers may be carbonized under various inert gas purge or vacuum conditions, preferably under inert gas purge conditions, for the vacuum pyrolysis, preferably at low pressures (e.g. less than 0.1 millibar). In one embodiment the pyrolysis utilizes a controlled purge gas atmosphere during pyrolysis in which low levels of oxygen are present in an inert gas. By way of example, an inert gas such as argon is used as the purge gas atmosphere. Other suitable inert gases include, but are not limited to, nitrogen, helium, or any combinations thereof. By using any suitable method such as a valve, the inert gas containing a specific concentration of oxygen may be introduced into the pyrolysis atmosphere. For example, the amount of oxygen in the purge atmosphere may be less than about 50 ppm (parts per million) $O_2/Ar$. Alternatively, the amount of oxygen in the purge atmosphere may be less than 40 ppm $O_2/Ar$. Embodiments include pyrolysis atmospheres with about 8 ppm, 7 ppm, or 4 ppm $O_2/Ar$.

The gas permeation properties of a membrane can be determined by gas permeation experiments. Two intrinsic properties have utility in evaluating separation performance of a membrane material: its "permeability," a measure of the membrane's intrinsic productivity; and its "selectivity," a measure of the membrane's separation efficiency. One typically determines "permeability" in Barrer (1 Barrer=$10^{-10}$ [$cm^3$ (STP) cm]/[$cm^2$ s cmHg], calculated as the flux ($n_i$) divided by the partial pressure difference between the membrane upstream and downstream ($\Delta p_i$), and multiplied by the thickness of the membrane (l).

$$P_i = \frac{n_i \, l}{\Delta p_i}$$

Another term, "permeance," is defined herein as productivity of asymmetric hollow fiber membranes and is typically measured in Gas Permeation Units (GPU) (1 GPU=$10^{-6}$ [$cm^3$ (STP)]/[$cm^2$ s cmHg]), determined by dividing permeability by effective membrane separation layer thickness.

$$\left(\frac{P_i}{l}\right) = \frac{n_i}{\Delta p_i}$$

Finally, "selectivity" is defined herein as the ability of one gas's permeability through the membrane or permeance relative to the same property of another gas. It is measured as a unitless ratio.

$$\alpha_{i/j} = \frac{P_i}{P_j} = \frac{(P_i/l)}{(P_j/l)}$$

In a particular embodiment, the CMS membrane produced by the method enables a carbon hollow fiber CMS membrane that has a permeance of at least 5 GPU for a target gas molecule (permeate) and a selectivity of at least 10 and a stability such that said permeance and selectivity varies less than 20% after continuously separating a feed gas comprised of a retentate gas molecule and permeate gas molecule for 10 days. Desirably, the permeance and selectivity varies less than 15%, 10% or 5% after continuously separating a feed gas comprised of a retentate and permeate gas molecule pair for 10, 30 or 60 days. In particular embodiments the permeate/retentate gas molecule pairs may be ethylene/ethane, propylene/propane, butylene/butane, methane/carbon dioxide, methane/water, oxygen/nitrogen, and methane/hydrogen sulfide. Illustratively, the feed gas generally is comprised of at least 50% of the permeate gas molecule (e.g., ethylene or propylene) and 25% of retentate gas molecule (e.g., ethane or propane).

In a particular embodiment the CMS membrane produced has a permeance of at least 10 GPU for propylene (permeate) and a selectivity of at least 35 propylene/propane. Desirably, in this embodiment the permeance is at least 12, 15 or even 18 GPU for propylene. Likewise, in this embodiment the selectivity is at least 40, 45 or even 50 for propylene/propane. In another particular embodiment, the CMS membrane produced has a permeance of at least 10 GPU for ethylene (permeate) and a selectivity of at least 6 ethylene/ethane. Desirably, in this embodiment the permeance is at least 15, 18 or even 20 GPU for ethylene. Likewise, in this embodiment the selectivity is at least 8, 10 or even 12 for ethylene/ethane. In a further embodiment, the CMS membrane produced has a permeance of at least 10 GPU for butylene (permeate) and a selectivity of at least 5 butylene/butane. Desirably, in this embodiment the permeance is at least 20, 30 or even 40 GPU for butylene. Likewise, in this embodiment the selectivity is at least 10, 15 or even 30 for butylene/butane.

The CMS membranes are particularly suitable for separating gases that are similar in sizes such as described above and involve flowing a gas feed containing a desired gas molecule and at least one other gas molecule through the CMS membrane. The flowing results in a first stream have an increased concentration of the desired gas molecule and second stream having an increased concentration of the other gas molecule. The process may be utilized to separate any of the aforementioned gas pairs and in particular is suitable for separating ethylene and ethane or propylene and propylene. Likewise, the process exhibits the same stability as it relates to permeance and selectivity over time as described above. When practicing the process, the CMS membrane is desirably fabricated into a module comprising a sealable enclosure comprised of a plurality of carbon molecular sieve membranes that is comprised of at least one carbon molecular sieve membrane produced by the method of the invention that are contained within the sealable enclosure. The sealable enclosure having an inlet for introducing a gas feed comprised of at least two differing gas molecules; a first outlet for permitting egress of a permeate gas stream; and a second outlet for egress of a retentate gas stream.

EXAMPLES

CMS Membrane Preparation:

The CMS membranes were made using 6FDA:BPDA-DAM polymer. The 6FDA:BPDA-DAM was acquired from Akron Polymer Systems, Akron, Ohio. The polymer was dried under vacuum at 110° C. for 24 hours and then a dope was formed. The dope was made by mixing the 6FDA:BPDA-DAM polymer with solvents and compounds in Table 1 and roll mixed in a Qorpak™ glass bottle sealed with a polytetrafluoroethylene (TEFLON™) cap and rolling a speed of 5 revolutions per minute (rpm) for a period of about 3 weeks to form a homogeneous dope.

TABLE 1

Dope formulation
Dope Composition

| Component | weight % | mass (gm) |
|---|---|---|
| 6FDA:BPDA-DAM | 20.0% | 50.20 |
| NMP | 47.5% | 119.23 |
| THF | 10.0% | 25.10 |
| Ethanol | 16.0% | 40.16 |
| LiNO3 | 6.5% | 16.32 |

NMP = N-Methyl-2-pyrrolidone;
THF = Tetrahydrofuran

The homogeneous dope was loaded into a 500 milliliter (mL) syringe pump and allow the dope to degas overnight by heating the pump to a set point temperature of 50° C. using a heating tape.

Bore fluid (80 wt % NMP and 20 wt % water, based on total bore fluid weight) was loaded into a separate 100 mL syringe pump and then the dope and bore fluid were co-extruded through a spinneret operating at a flow rate of 180 milliliters per hour (mL/hr) for the dope; 60 mL/hr bore fluid, filtering both the bore fluid and the dope in line between delivery pumps and the spinneret using 40 μm and 2 μm metal filters. The temperature was controlled using thermocouples and heating tape placed on the spinneret, dope filters and dope pump at a set point temperature of 70° C.

After passing through a fifteen centimeter (cm) air gap, the nascent fibers that were formed by the spinneret were quenched in a water bath (50° C.) and the fibers were allowed to phase separate. The fibers were collected using a 0.32 meter (M) diameter polyethylene drum passing over TEFLON guides and operating at a take-up rate of 42 meters per minute (M/min).

The fibers were cut from the drum and rinsed at least four times in separate water baths over a span of 48 hours. The rinsed fibers in glass containers and effect solvent exchange three times with methanol for 20 minutes and then hexane for 20 minutes before recovering the fibers and drying them under vacuum at a set point temperature of 110° C. for one hour.

Prior to pyrolyzing the fibers, a sample quantity of the above fibers (also known as "precursor fibers") were tested for skin integrity. One or more hollow precursor fibers were potted into a ¼ inch (0.64 cm) (outside diameter, OD) stainless steel tubing. Each tubing end was connected to a ¼ inch (0.64 cm) stainless steel tee; and each tee was connected to ¼ inch (0.64 cm) female and male NPT tube adapters, which were sealed to NPT connections with epoxy. Pure gas permeation tests were performed in a constant-volume system maintained at 35° C. For each permeation test, the entire system and leak rate was determined to ensure that the leakage was less than 1 percent of the permeation rate of the slowest gas. After evacuating, the upstream end was pressurized (end closest to feed source) of the tube with feed gas (e.g. pure oxygen or pure nitrogen) while keeping the downstream end (end furthest from feed source) under vacuum. The pressure rise was recorded in a constant, known downstream volume over time using LAB VIEW software (National Instruments, Austin, Tex.) until reaching steady state. The permeance of each gas was determined through the membrane by the rate of pressure rise, the membrane area and the pressure difference across the membrane. The selectivity of each gas pair as a ratio of the individual gas permeance was calculated.

The hollow fibers were pyrolyzed to form the CMS membranes by placing the precursor fibers on a stainless steel wire mesh plate each of them bound separately to the plate using stainless steel wire. The combination of hollow fibers and mesh plate were placed into a quartz tube that sits in a tube furnace. The fibers were pyrolyzed under an inert gas (argon flowing at a rate of 200 standard cubic centimeters per minute (sccm)). Prior to pyrolyzing the furnace was purged of oxygen by evacuating and then purging the tube furnace for a minimum of four hours to reduce the oxygen level to less than 1 ppm. All of the fibers were heated at a ramp rate and held at the maximum soak temperature as shown in Table 1. The fibers were cooled passively (furnace shut off with the same inert gas flow maintained until the furnace was cooled to about room temperature ~15 hours).

After cooling the fibers were left to sit under the inert gas stream for 24 hours to allow the newly formed CMS to stabilize. Afterwards they were removed from the furnace and potted into modules as described above. The modules were allowed 2 hours to set before being loaded into the permeation testing system. All permeation tests were determined using a 50:50 mixture of propylene and propane in a constant volume system described above with 50 psia upstream and downstream vacuum at 35° C.

TABLE 2

| | Pyrolysis Conditions | | | | | | |
|---|---|---|---|---|---|---|---|
| Example | Temp (° C.) | Atmosphere (sccm/Ar) | Heating Rate (C/min) | Soak Time (min) | Cooling Method | $C_3''$ Permeance (GPU) | $C_3''/C_3$ Selectivity |
| Example 1 | 675 | 200 | 4 | 60 | Passive | 23.6 | 47.8 |
| Comparative 1 | 675 | 200 | 10* | 0 | Passive | 23.0 | 28.0 |
| Comparative 2 | 600 | 200 | 10* | 60 | Passive | 40.7 | 14.3 |
| Comparative 3 | 675 | 200 | 4 | 120 | passive | 10.4 | 48.3 |
| Comparative 4 | 675 | 200 | 10 | 60 | passive | 9.4 | 43.2 |

*heating to 660° C. at 10° C./min then at 4° C./min to 675° C.

TABLE 3

| | Pyrolysis Conditions | | | | | |
|---|---|---|---|---|---|---|
| Example | Temp (° C.) | Atmosphere (sccm/Ar) | Soak Time (min) | Cooling Method | $C_3''$ Permeance (GPU) | $C_3''/C_3$ Selectivity |
| Example 2 | 675 | 200 | 60 | Quick | 27.1 ± 5.2 | 22.9 ± 0.8 |
| Example 3 | 675 | 200 | 60 | Super | 31.4 ± 4.5 | 15.5 ± 0.2 |
| Comparative 5 | 675 | 200 | 60 | Passive | 18.5 ± 4.5 | 31.5 ± 1.7 |

Comparative Example 1

Vacuum was quickly pulled to remove all ambient gas from the system and immediately after a 50:50 mixture of $C_3''/C_3$ (propylene/propane) was fed to the modules having the pyrolyzed fibers as shown in Table 2. For each test steady state was confirmed by taking multiple permeation rate measurements and measuring the permeate using a gas chromatograph; the system was deemed at steady state when these measurements changed by <2%. The propylene permeance and propylene/propane selectivity is shown Table 2.

Comparative Example 2

Comparative Example 2 was the same as Comparative Example 1 except that the fibers that were used in the CMS module were pyrolyzed as shown in Table 2. The propylene permeance and propylene/propane selectivity is shown Table 2.

Comparative Example 3

Comparative Example 3 was the same as Comparative Example 1 except that the fibers that were used in the CMS module were pyrolyzed as shown in Table 2. The propylene permeance and propylene/propane selectivity is shown Table 2.

Comparative Example 4

Comparative Example 4 was the same as Comparative Example 1 except that the fibers that were used in the CMS module were pyrolyzed as shown in Table 2. The propylene permeance and propylene/propane selectivity is shown Table 2.

Example 1

Example 1 was the same as Comparative Example 1 except that the fibers that were used in the CMS module were pyrolyzed as shown in Table 2. The permeance and selectivity of Example 1 are also shown in Table 2.

Comparative Example 5

Comparative Example 3 was the same as Comparative Example 1 except that the fibers that were used in the CMS module were pyrolyzed by heating to 660° C. at 10° C./min then at 4° C./min to 675° C. and soaked for 60 minutes at that temperature. The fibers were cooled passively in a like manner as Comparative 1. The propylene permeance and propylene/propane selectivity is shown in Table 3.

Example 2

Example 2 was the same as Comparative Example 5 except that the fibers were cooled quickly by opening the tube furnace insulation box halfway ("Quick Cooling"). The propylene permeance and propylene/propane selectivity is shown in Table 3.

Example 3

Example 3 was the same as Example 2 except that the fibers were cooled even more quickly by opening the tube furnace insulation box all the way ("Super Cooling"). The propylene permeance and propylene/propane selectivity is shown in Table 3. The cooling rate for Comparative Example 5 and Examples 2 and 3 are shown in the FIGURE.

What is claimed is:

1. A method of making a carbon molecular sieve membrane comprising,
   (i) providing a polyimide precursor polymer;
   (ii) heating, in a furnace, said polyimide precursor polymer to a final pyrolysis temperature of 600° C. to 700° C. at a pyrolysis heating rate of 3 to 7° C./minute from 400° C. to the final pyrolysis temperature, the final pyrolysis temperature being held for a pyrolysis time of at most 60 minutes in a non-oxidizing atmosphere to form the carbon molecular sieve membrane; and
   (iii) cooling the carbon molecular sieve membrane to room temperature, and
   wherein the cooling is accelerated by removing heat using a heat removal method such that the cooling rate is at least 23° C./min from the final pyrolysis temperature to 400° C.

2. The method of claim 1, wherein the heat removal method comprises one or more of the following: removing insulation from the furnace; flowing a gas directly over the carbon molecular sieve membrane; flowing a gas through the carbon molecular sieve membrane; flowing a liquid over at least a portion of the furnace or flowing a gas over at least a portion of the furnace.

3. The method of claim 1, wherein the average cooling rate from the final pyrolysis temperature to 400° C. is at least 36° C./minute.

4. The method of claim 2, wherein the flowing of the liquid over at least a portion of the furnace is performed by using a metal cooling jacket or cooling coils.

5. The method of claim 1, wherein the average cooling rate from the final pyrolysis temperature to 400° C. is at least 23° C./minute to 36° C./minute.

6. The method of claim 1, wherein the pyrolysis heating rate is held at one heating rate.

7. The method of claim 6, wherein the same heating rate is maintained from room temperature to the final pyrolysis temperature.

8. The method of claim 1, wherein the pyrolysis time is from 15 minutes to 60 minutes.

9. A process for separating a gas molecule from a feed gas comprised of the gas molecule and at least one other gas molecule comprising
   (i) providing the carbon molecular sieve membrane produced by claim 1; and
   (ii) flowing the gas feed through said carbon molecular sieve membrane to produce a first stream having an increased concentration of the gas molecule and a second stream having an increased concentration of the at least one other gas molecule.

10. The process of claim 9, wherein the gas molecule and the at least one other gas molecule is: ethylene and ethane; propylene and propane; butylene and butane; oxygen and nitrogen; or carbon dioxide and methane.

11. The process of claim 10, wherein the gas molecule and other gas molecule is ethylene and ethane or propylene and propane.

12. The process of claim 10, wherein the carbon molecular sieve membrane has a selectivity of at least 6 of ethylene/ethane and an ethylene permeance of at least 10 GPU at 35° C.

13. The process of claim 10, wherein the carbon molecular sieve membrane has a selectivity of least 35 of propylene/propane and a propylene permeance of at least 10 GPU at 35° C.

14. The process of claim 10, wherein the feed gas is comprised of at least 30% butylene and 25% of butane and the gas molecule is butylene.

15. A method of making a carbon molecular sieve membrane comprising,
   (i) providing a polyimide precursor polymer;
   (ii) heating, in a furnace, said polyimide precursor polymer to a final pyrolysis temperature of 500° C. to 1500° C. at a pyrolysis heating rate of 0.01 to 200° C./minute to the final pyrolysis temperature to form the carbon molecular sieve membrane, the final pyrolysis temperature being held for a pyrolysis time of several seconds to several days in a non-oxidizing atmosphere;
   (iii) cooling the carbon molecular sieve membrane to room temperature at an accelerated cooling rate of at least 23° C./min from the final pyrolysis temperature to 400° C.

16. The method of claim 15, wherein the cooling is accelerated by removing heat using a heat removal method.

17. The method of claim 16, wherein the heat removal method comprises one or more of the following: removing insulation from the furnace; flowing a gas directly over the carbon molecular sieve membrane; flowing a gas through the carbon molecular sieve membrane; flowing a liquid over at least a portion of the furnace or flowing a gas over at least a portion of the furnace.

* * * * *